May 22, 1951  H. W. PRICE  2,554,315
POWER STEERING MECHANISM
Filed Dec. 13, 1945

INVENTOR.
HAROLD W. PRICE
BY
H. O. Clayton
ATTORNEY

Patented May 22, 1951

2,554,315

UNITED STATES PATENT OFFICE 2,554,315

POWER STEERING MECHANISM

Harold W. Price, Bradenton, Fla., assignor to Bendix Aviation Corporation, South Bend, Ind., a corporation of Delaware Application December 13, 1945, Serial No. 634,854

2 Claims. (Cl. 180—79.2)

This invention relates in general to the steering mechanism of an automotive vehicle and more specifically to a combined power and manually operated mechanism for actuating the dirigible wheels of said vehicle.

An object of my invention is to provide a simple and compact mechanism wherein the front, that is, dirigible wheels of an automotive vehicle may be actuated solely by power means, preferably a double-acting pressure differential operated motor, or by the operation of said motor aided by the physical effort of the driver or solely by the physical effort of the driver in the event of failure of said motor. Yet another object of my invention is to provide a steering mechanism including all of the aforementioned features together with means for advising the driver of the vehicle of the degree of force being exerted by the pressure differential operated motor as the mechanism is being operated to steer the wheels.

Yet another object of my invention is to provide, in the steering mechanism of an automotive vehicle, a simple and compact force transmitting means interconnecting a pitman arm, a drag link, a double-acting pressure differential operated motor and a control valve for said motor, said force transmitting means including a floating lever operable to facilitate the operation of said mechanism.

A further object of my invention is to provide a compact four-way control valve for controlling a double-acting pressure differential operated motor, said valve being constructed to effect a follow-up control of said motor and also being constructed to provide a so-called feel control, that is, provide a control wherein the valve is operative, in cooperation with the force transmitting means interconnecting the valve with the steering wheel, to advise the driver of the vehicle of the degree of force being exerted by said motor.

Other objects and desirable details of my invention will become apparent to those skilled in the art from the following description, in which.

Figure 1:
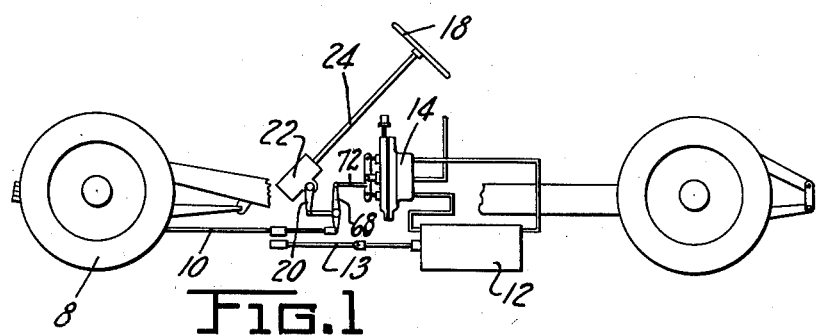
Figure 1 is a diagrammatic view disclosing the steering mechanism of my invention said mechanism constituting a part of the control means of an automotive vehicle.

Referring now to Figure 1 of the drawings disclosing a preferred embodiment of my invention, the front, that is, dirigible wheels 8 of the vehicle are actuated by the conventional tie-rod, steering knuckle, etc., not shown; and this conventional steering mechanism includes, of course, a drag link 10. Now the mechanism for actuating the drag link 10 constitutes my invention and the principal parts of said mechanism include a double acting pressure differential motor 12 operably connected to the drag link by a rod 13, a so-called follow-up and pressure sensitive type of four-way control valve 14 for controlling the operation of said motor and force transmitting means interconnecting the power element 15 of the motor, the drag link, the control valve and the conventional steering wheel 18 of the vehicle. This force transmitting means includes the usual angularly movable pitman arm 20 which is operably connected to the steering wheel by the usual gearing 22 mounted at the base of the steering post 24.

Describing now one of the most important features of my invention, that is, the aforementioned four-way control valve 14, this valve comprises two casing members 26 and 28 having secured therebetween a flexible diaphragm member 30. The casing member 26 is ported at 32 to receive a conduit leading to an air cleaner 34; and the casing member 28 is ported at 36, 38 and 40 to receive respectively conduits 42, 44 and 46 connected respectively to one end compartment 43 of the motor 12, a source of vacuum preferably the intake manifold of the engine of the vehicle, and the other end compartment 45 of the motor 12. The port 36 is connected with a valve compartment 48; the port 38 is connected, by ports 50 with a valve compartment 52; and the port 40 is connected to a valve compartment 54. As disclosed in Figure 1 the diaphragm 30 is clamped at its central portions between portions of valve casing members thereby providing in effect two separate diaphragm members. One of said members serves as a partition wall between the aforementioned compartment 48 and a valve compartment 56 and the other of said diaphragm members serves as a partition wall between the aforementioned compartment 54 and a compartment 58. A valve operated walking beam or lever member 60 is pivotally mounted at 62 to a boss extending from the casing member 26 and to the ends of said lever member there are connected pins having secured to their ends cup-shaped plate members 64 and 66 which rest upon the diaphragm 30.

Describing now the force transmitting linkage interconnecting the valve operated lever 60, the pitman arm 20 and the drag link 10 said linkage includes a floating lever 68 which is pivotally connected at 70 to the drag link and to the lever 60 by a link 72; and a link 74 serves to pivotally interconnect one end of the pitman arm with a portion of the lever 68 intermediate its ends.

Figure 2:
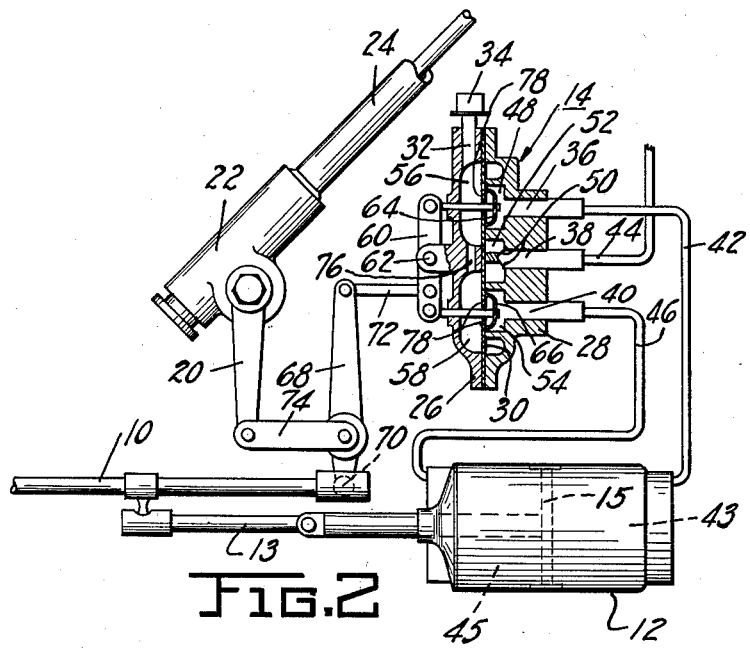
Figure 2 is an enlarged view of the steering mechanism of Figure 1, the control valve of the power means of said mechanism being shown in section.

Describing now the operation of the steering mechanism disclosed in Figures 1 and 2 it is to be noted that the parts of the mechanism are shown in the positions assumed when the wheels 8 are in their straight-ahead position; and when in this position the power element 15 of the motor 12 is in its central position and the valve parts and parts of the force transmitting means are in the positions disclosed in Figure 2.

To effect a right turn operation of the steering wheels the driver will then rotate the steering wheel to the right, that is clockwise, and this operation serves to effect, shall we say, a counter-clockwise rotation of the pitman arm 20. The link 74 is thus placed under compression to effect a clockwise rotation of the lever 68 about the pivot 70 as a fulcrum; for the resistance to movement of the drag link 10 is at this time greater than the force necessary to rotate the lever 60 which is rotated counterclockwise. The latter operation serves to move the valve operated member 66 to the right thereby venting the motor compartment 45 to the atmosphere via the air cleaner 34, valve port 32, valve compartment 56, a duct 76 serving to interconnect the compartments 56 and 58, the valve compartment 58, openings 78 in the diaphragm 30, port 40 and conduit 46; and this counterclockwise rotation of the lever 60 also serves to move the upper part of the diaphragm 30 to the left thereby interconnecting the compartment 43 of the motor 12 with the vacuum source this air transmitting connection being effected via the conduit 44, port 38, valve compartment 52, valve compartment 48, port 36 and conduit 42.

It follows, therefore, that with the above described operation of the valve 14 the motor 12 is energized to effect a rightward movement of the piston 15; and this operation serves to move the drag link 10 to the right to effect a right turn operation of the steering wheels 8.

If the driver desires to only partially effect the right turn operation of the steering wheels he will, of course, arrest the movement of the steering wheel 18 whereupon the pivotal connection between the link 74 and the floating lever 68 becomes a fulcrum for said lever to effect a follow-up or off-called lapping operation of the valve 14. Describing this operation the lever 68 is rotated counterclockwise thereby effecting a clockwise rotation of the lever 60 to return the valve parts to the positions disclosed in Figure 2; and this operation serves to cut off the connection of the motor compartments 43 and 45 with the atmosphere and vacuum, respectively. The system is then in equilibrium and all parts of the mechanism are stationary the compartments 43 and 45 being, as it were, bottled up. Now when the driver resumes the rotation of the steering wheel to complete the right turn steering operation the valve 14 is again opened to again energize the motor 14 thereby resuming the rightward movement of the drag link 10.

Referring now to an important feature of my invention it is to be noted that the driver is at all times, during the operation of the above described mechanism, advised of the degree of power being exerted by the motor 12; for after the valve has been opened, all as described above, then the upper end of the lever 60 is, by virtue of the differential of pressures then acting upon the upper part of the diaphragm 30, subjected to a force which is directly proportional to the force being exerted by the piston 15. It is also to be noted that in the above described operation if the driver continues the rotation of the steering wheel after the valve is opened, then he may add his physical effort to that derived from the motor 12; for after the member 66 is moved into contact with the casing member 28 then it is impossible to continue the movement of the upper end of the lever 68 whereupon continued movement of the pitman arm by the physical effort of the driver results in the addition of said physical effort or force to the then existing drag link operating force resulting from the operation of the motor 12. This physical effort must, of course, be of such magnitude as to exceed that required to merely maintain the valve 14 open; for if the physical effort is so limited then the steering is effected solely by an operation of the power means of my invention.

If the power means should fail during the operation of the mechanism, that is, if either the valve 14 or motor 12 should fail of operation, then the steering operation is effected solely by the operation of the physical effort of the driver.

There is thus provided, by the mechanism of my invention disclosed in Figures 1 and 2, means for effecting the steering of the vehicle solely by an operation of the power means, that is, an operation of the motor 12; and the above described mechanism of my invention provides a means for combining the physical effort of the driver with the power means to effect the steering of the vehicle, that is, there is provided means for effecting a concurrent manual and power operation of the mechanism; and the mechanism of my invention also provides means for effecting a steering of the vehicle solely by the physical effort of the driver in the event of failure of the power means; and my invention also provides a control whereby the driver may, by virtue of the operation of the follow-up and pressure sensitive reactionary valve 14, "feel" the operation of the power means; and lastly my invention provides a control whereby the driver may, by virtue of the follow-up to lap operation of the valve 14, effect a step by step operation of the steering mechanism.

The above description has been limited to a right turn operation of the steering wheels; however, it will be obvious from said description and from an inspection of Figure 2 of the drawings that the mechanism may be operated to effect a left turn operation of the steering wheels when the steering wheel 18 is rotated counterclockwise.

Figure 3:
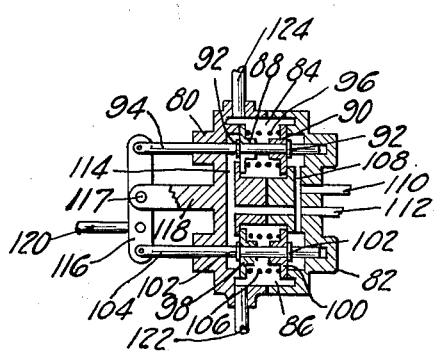
Figure 3 is a sectional view disclosing details of a modified form of control valve for the power mechanism of Figure 1.

There is disclosed in Figure 3 a modified form of control valve for the motor 12. As with the above described valve 14 the valve of Figure 3 includes two casing members 80 and 82; and said members are recessed to provide compartments 84 and 86. Valve members 88 and 90, which contact split rings 92 secured to a rod 94, are slidably mounted on said rod and are biased, by a spring 96, into engagement with said rings acting as stops. Within the valve compartment 86 there are housed valve members 98 and 100 which abut split rings 102 secured to a valve rod 104; and a spring 106 serves to bias said valve members into engagement with said rings acting as stops. The compartments 84 and 86 are connected, by a duct 108 and conduit 110, to a source of vacuum preferably the intake manifold of the internal combustion engine of the vehicle; and said compartments 84 and 86 are vented to the atmosphere via a conduit 112 and a duct 114. Completing the description of the valve mechanism of Figure 3 the valve operating rods 94 and 104 are connected at their outer ends to the ends of a valve operated lever 116 which is pivotally mounted at 117 upon a boss 118 extending from the valve casing member 80; and a rod 120, which may be connected to the floating lever of Figure 2, is connected to the lever 116 intermediate the pivot 117 and one end of said lever.

Describing now the operation of the valve mechanism of Figure 3 the parts of the same assume the positions disclosed in said figure when the dirigible wheels 8 are in their straight-ahead position. To open the valve the steering wheel is rotated one way or the other thereby placing rod 120 either in compression or tension; and as will be obvious from an inspection of Figure 3 these operations serve to move two of the valve members 88, 90, 98 and 100 to vent one end of the motor to atmosphere and connect the other end to the source of vacuum, said connections being effected by means of conduits 122 and 124. As with the operation of valve 14 of Figure 2 the valve 43 is placed in its lapped position when the driver arrests the rotation of the steering wheel. In other words, the valve of Figure 3 is what is known as a follow-up valve.

In conclusion it is to be noted that the valve of Figure 3 may be substituted for the valve of Figure 2 the steering mechanism then having all of the above described features with the exception of the so-called "feel" operation.

I claim:

1. Mechanism adapted to effect the steering operation of the dirigible wheels of an automotive vehicle said mechanism including a drag link, a pitman arm, a double-acting pressure differential operated motor, valve means for controlling the operation of said motor including a casing member and feel means within the casing operative when the valve means is operative to advise the operator of the degree of force being exerted by the motor, and force transmitting means interconnecting the power element of the motor, the valve mechanism, the pitman arm and the drag link, said force transmitting means including a valve operating lever pivotally connected, at or about its center, to the valve casing and at its ends to the aforementioned feel means, a floating lever pivotally connected at one of its ends to one end of the drag link and connected at its other end to the aforementioned lever, means interconnecting one end of the pitman arm with said floating lever, the connection with said lever being near one of its ends.

2. Power and/or manually operated mechanism for effecting the steering operation of the dirigible wheels of an automotive vehicle including a drag link, a pitman arm, a double acting pressure differential operative motor, a pressure sensitive and follow-up controlled valve mechanism for controlling the operation of said motor including a casing member and means within the casing for controlling a flow of power fluid into and out of the casing and for resisting the operation of the valve to thereby provide a feel means for advising the driver of the degree of operation of the motor, and force transmitting means interconnecting the power element of the motor, the valve mechanism, the drag link and the pitman arm including a valve operating lever member pivotally connected to the casing of the valve, a floating lever member pivotally connected to the drag link at one of its ends, and connected at its other end to the aforementioned lever member, and pivotally connected at a point intermediate its ends to said pitman arm, said floating lever fulcruming at one of its ends during the operation of the opening of the valve and fulcruming at said point intermediate its end effecting the operation of lapping of the valve.

HAROLD W. PRICE.

REFERENCES CITED

The following references are of record in the file of this patent:

UNITED STATES PATENTS

| Number | Name | Date |
|---|---|---|
| 1,258,342 | Justen | Mar. 5, 1918 |
| 2,051,816 | Bragg | Aug. 25, 1936 |
| 2,069,540 | Sanford | Feb. 2, 1937 |
| 2,195,932 | Maloney et al. | Apr. 2, 1940 |
| 2,369,547 | Eaton | Feb. 13, 1945 |
| 2,429,185 | Hukill | Oct. 14, 1947 |